United States Patent [19]

Oldani

[11] Patent Number: 4,580,764
[45] Date of Patent: Apr. 8, 1986

[54] PEDESTRIAN-CONTROLLED LIFT TRUCK FOR MOVING HELICOPTERS

[76] Inventor: Gaetano Oldani, Via Stromboli, 20, 20089 Rozzano (Milano), Italy

[21] Appl. No.: 584,999

[22] Filed: Mar. 1, 1984

[30] Foreign Application Priority Data

Mar. 21, 1983 [IT] Italy .............................. 21197/83[U]

[51] Int. Cl.[4] .............................................. B60P 1/48
[52] U.S. Cl. .................................................. 254/9 C
[58] Field of Search .............. 254/2 R, 2 B, 2 C, 8 R, 254/8 B, 8 C, 9 R, 9 B, 9 C, 10 R, 10 B, 10 C, 122, 124; 187/18; 182/63, 141, 148, 69

[56] References Cited

U.S. PATENT DOCUMENTS

| 2,712,430 | 7/1955 | Stuebing | 254/2 C |
| 2,940,769 | 6/1960 | Taylor | 254/9 C |
| 3,032,319 | 5/1962 | Dale | 254/122 |
| 3,080,147 | 3/1963 | Greenhaw | 254/2 B |
| 3,090,514 | 5/1963 | Black | 254/122 |

*Primary Examiner*—Robert C. Watson
*Attorney, Agent, or Firm*—Bucknam and Archer

[57] ABSTRACT

The truck comprises a rigid basic frame mounted on wheel pairs, at least one of which is a driving pair, to the basic frame longitudinal stringers there being slidably connected, through a cylindrical articulation, respective ends of two bar pairs crossing each other and mutually articulated, the opposite ends of the bar pairs being coupled to two additional longitudinal stringers interconnected by crossbeams.

2 Claims, 3 Drawing Figures

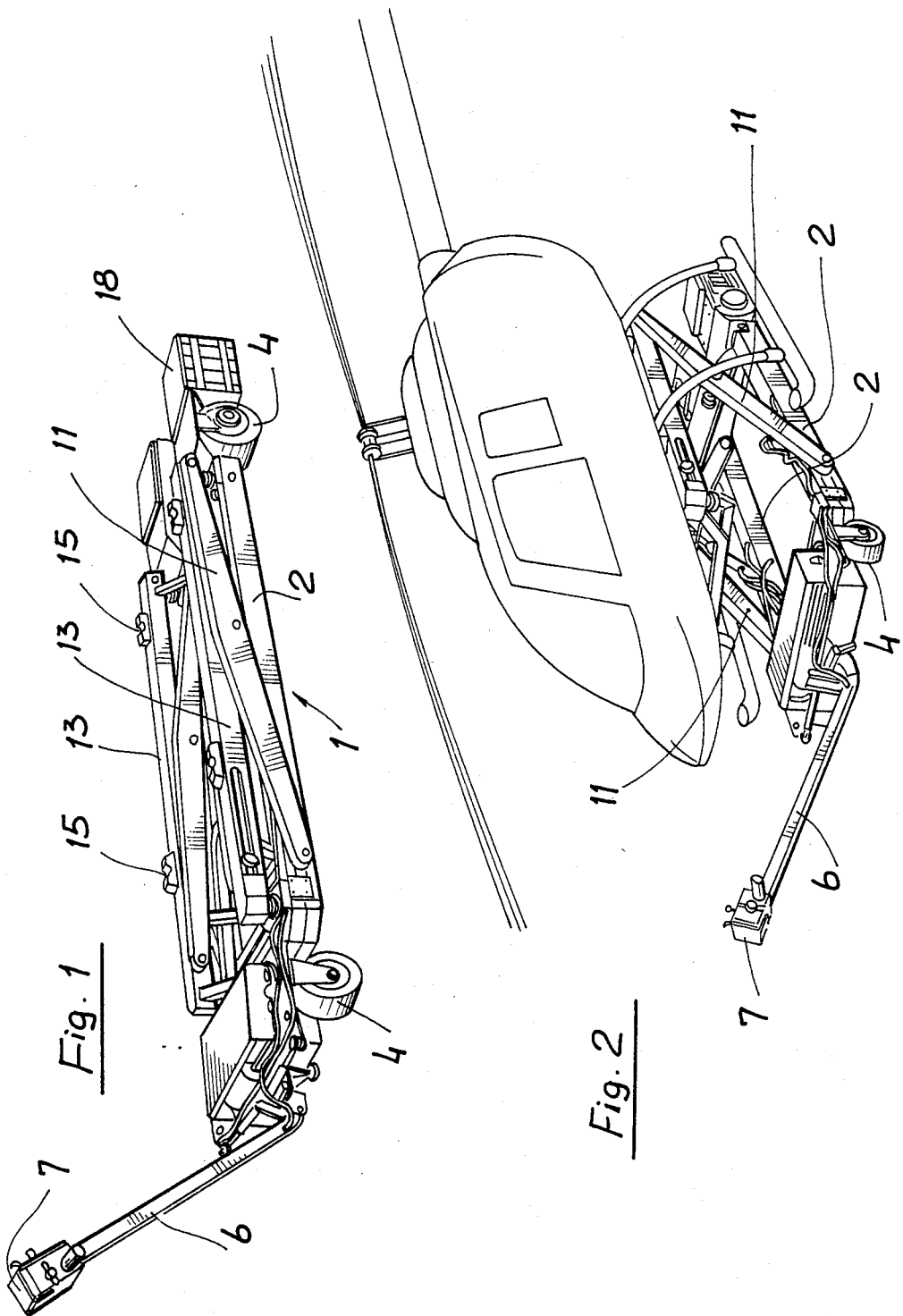

PEDESTRIAN-CONTROLLED LIFT TRUCK FOR MOVING HELICOPTERS

BACKGROUND OF THE INVENTION

This invention relates to a pedestrian-controlled lift truck particularly for moving helicopters across hardstands.

As is known, helicopters, whether equipped with a landing gear of the skid or wheel types, normally require to be moved about, either between a hangar and hardstand, or between different areas of a hardstand.

Particularly for moving helicopters having a skid type of landing gear, trucks have been used which incorporate a lifting device, said device having not been designed heretofore, however, specifically to properly fit and support a helicopter structure.

Accordingly, such prior design trucks may give rise to problems as concerns their handling at the time they are to be driven under a helicopter for moving it.

Further, such conventional trucks have fairly complex constructions, and may fail to provide adequate strength capabilities, or at least, may have limited performance capabilities.

SUMMARY OF THE INVENTION

It is an object of this invention to obviate such prior disadvantages by providing a pedestrian-controlled lift truck for moving helicopters, which is simple and strong construction-wise, and can give full assurance, therefore, of a high degree of reliability while in use.

A further object of the invention is to provide a pedestrian-controlled lift truck for moving helicopters, which can apply a properly controlled and gradual lifting action.

Another object of the invention is to provide a pedestrian-controlled lift truck for moving helicopters, which is easy to operate and adapted to fit under a helicopter to be moved.

These and other objects, such as will be apparent hereinafter, are achieved by a pedestrian-controlled lift truck, according to the characterizing clause of the appended claims.

BRIEF DESCRIPTION OF THE DRAWINGS

Further features and advantages of this pedestrian-controlled lift truck will be more readily understood from the following description of a preferred embodiment thereof, with reference to the accompanying illustrative drawings, where:

FIG. 1 shows this lift truck, schematically and in perspective, in a collapsed condition;

FIG. 2 shows this same lift truck in an extended condition, as supporting a helicopter.

DESCRIPTION OF THE PREFERRED EMBODIMENT

Figure 3:
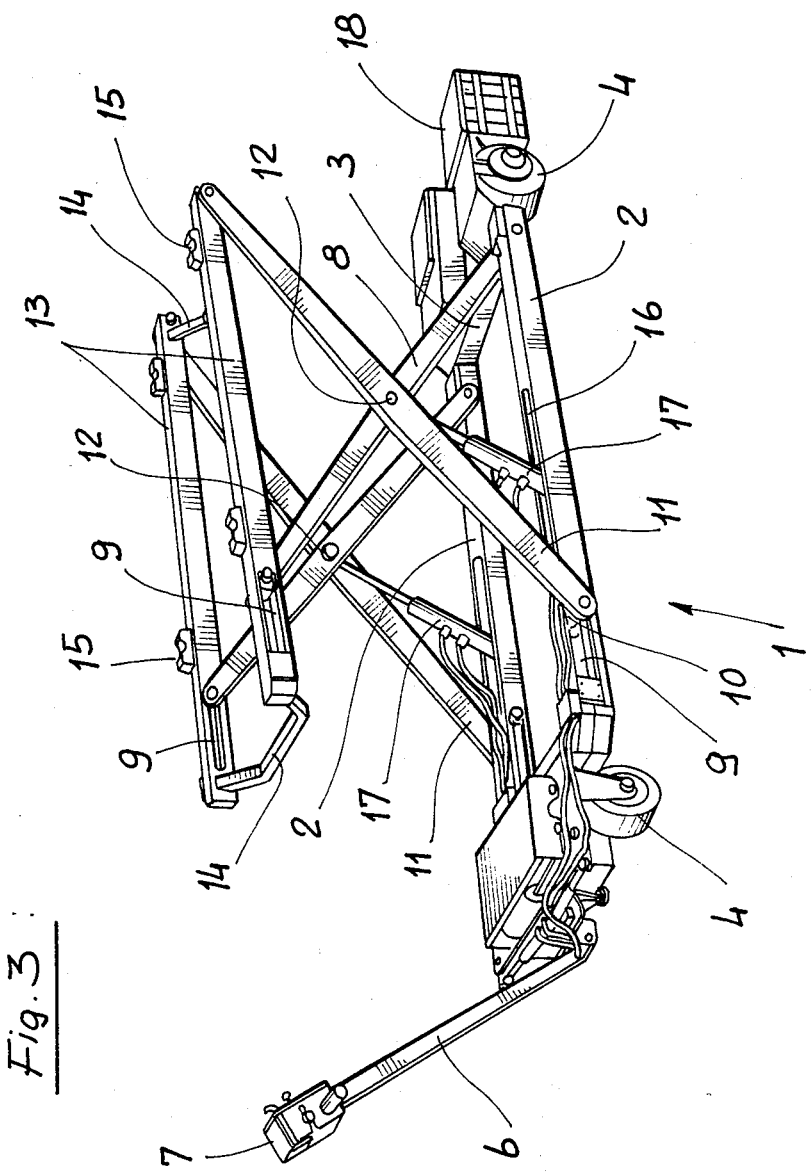
FIG. 3 shows this lift truck in the fully extended condition thereof.

With particular reference to the numerals used through the drawing views, this pedestrian-controlled lift truck comprises a rigid basic frame, generally indicated at 1, which includes two longitudinal stringers 2 interconnected by crossbeams 3.

That frame is mounted on wheel pairs 4, at least one of which is a driving pair, to practically define a truck having a steering system which acts, of preference, on the front wheels and has steering connections and "for life" swivel heads adapted to make it sensitive both in the no load and loaded conditions. These swivel heads, on the other hand are well known and do not pertain to the present invention, any further disclosure thereof being therefore omitted.

More specifically, the steering system construction comprises a rod 6 and related headpiece 7 for movement control, which can be tilted up such that the truck, when in the no load condition, may also be used for general transportation.

Articulated to one end of each said longitudinal stringers is a first bar 8, and at the opposite ends of said longitudinal stringers there are formed throughgoing transverse slots 9, wherein a further bar 11 engages by means of a slider 10. In particular, as shown, said slots 9 are formed directly in the stringers and therein there are firmly engaged the mentioned sliders 10, the slots 9 and sliders 10 providing a supporting structure of very high resistance both against comprensive, bending stresses and against torsional stresses, which is very important as high loads such helicopters are to be supported.

Said bars cross each other, and are mutually articulated together at the midpoints thereof as at 12, while supporting, via mirror like coupling arrangements relatively to the former, two further longitudinal stringers 13.

The latter stringers, in particular, have the same construction as those forming the rigid basic frame, and are firmly interconnected by end crossbeams 14 to leave their midportions quite unobstructed, and avoiding, accordingly, any interference with the aerial usually attached to the helicopter bottom fuselage.

Furthermore, the longitudinal stringers 13 are provided with special rubber pads 15, wherewith appropriate saddle seats may cooperate which would be designed in accordance with the helicopter model to be lifted. Thus the stringers 13 define a resting surface for a helicopter and, as stated, a stringer 2 of the frame stringers and a respective stringer 13 are coupled by a respective bar pair 8, 11 the bars whereof are pivoted at the middle, the bars of the bar pairs 8, 11 having respective ends articulated to respective ends of a said stringer of the frame stringer pair (or first stringer pair) and of a said stringer of said stringers 13 (or second stringer pair). According to the invention the other respective ends of said bars of said first and second bar pairs are engaged slidingly in respective slots 9 of said a stringer of said first stringer pair 2 and said a stringer of said second stringer pair 13, the bars of each bar pair laying in substantially spaced parallel planes which are spaced by the width of said stringers.

Articulated to a midportion of said longitudinal stringers in the basic frame, into special seatings open at the top 16, are two double-acting hydraulic cylinders 17 the piston rods whereof, ending in an eye, are pivotally coupled to articulation pins 12 of the bar pairs 8 and 11. Thus, owing to the pivotal coupling of said eye to the articulation pin 12 of the bar pair 8, 11, at an intermediate position between the bars of each pair, a large supporting surface at the pivoting region is obtained thereby improving the high load supporting capability of the structure.

Said cylinders are included in a hydraulic system supplied from an electro-hydraulic unit not specifically shown since it does not pertain to the present invention.

The electric system (also not shown) for operating the electro-hydraulic unit and the truck driving wheels, is a conventional one and powered from automotive batteries 18 located in the rear portion of the frame 1.

It should be further noted that, also conventionally the driving wheel would include an electro-magnetic brake, and can drive at an adjustable speed under control from an electronic unit, the controls for which, as well as the controls for the cited hydraulic system, are accommodated on the control head 7.

It will be appreciated from the foregoing description, and an examination of the accompanying drawings, that the pedestrian-controlled lift truck according to this invention is highly functional and practical and very safe to use. In fact, owing to the disclosed coupling of the longitudinal stringers by the illustrated bar pairs, with respective ends of bars of said pairs engaged in the transverse slots 9 formed through the stringers, it is obtained a supporting structure effective to safely support very high loads such as a helicopter, independently from the uneveness of the ground thereon the truck is moved. To this connection it should be pointed out that, as it should be apparent from the drawings (FIG. 3), each stringer 2 and 13 is arranged and coupled between the ends of the bars 8 and 11, which bars are spaced by the width of the stringers, thereby providing a great resistance also to the torsional stresses, in addition to the compressive and bending ones.

I claim:

1. In a pedestrian-controlled lift truck for moving helicopters, of the type comprising a rigid base frame mounted on wheel pairs, at least one of which is a driving pin, the pair of stringers of said frame being coupled by end crossbeams and the front pair of said wheels being provided with a steering assembly comprising a rod and related control head for movement control, said rod being tiltable upwardly, a second stringer pair substantially like said base frame stringer pair and also coupled by end crossbeams, said second stringer pair defining a resting surface for said helicopter, a stringer of said first stringer pair and a stringer of said second stringer pair being coupled by a first bar pair the bars whereof are pivoted at the middle, the other stringer of said first stringer pair and the other stringer of said second stringer pair being coupled by a second bar pair the bars whereof are pivoted at the middle, double action hydraulic cylinders acting on the pivot points of said first and second bar pairs, the bars of said first and second bar pairs having respective ends articulated to respective ends of said stringer of said first stringer pair and of a said stringer of said second stringer pair, the improvement wherein the other respective ends of said bars of said first and second bar pairs are engaged through a slider member in throughgoing transverse respective slots directly formed through said a stringer of said first stringer pair and said a stringer of said second stringer pair, and wherein the bars of each said bar pair lay in substantially spaced parallel planes which are spaced by the width of said stringers.

2. A pedestrian controlled lift truck for moving helicopters according to claim 1, wherein said hydraulic cylinders are articulated in specially provided seatings, open at the top, formed in said stringers of said base frame, and in that the piston rods thereof, ending in an eye, are pivotally coupled to the articulation pins of said said bar pair at an intermediate position between each bar pair.

* * * * *